Oct. 25, 1949.  J. B. LE POOLE  2,485,754
ELECTRON MICROSCOPE
Filed Jan. 16, 1948  2 Sheets-Sheet 1

INVENTOR.
JAN BART LE POOLE
BY
ATTORNEY.

Patented Oct. 25, 1949

2,485,754

UNITED STATES PATENT OFFICE 2,485,754

ELECTRON MICROSCOPE

Jan Bart Le Poole, Eindhoven, Netherlands, assignor to Hartford National Bank and Trust Company, Hartford, Conn., as trustee Application January 16, 1948, Serial No. 2,791
In the Netherlands January 25, 1947

13 Claims. (Cl. 250—49.5)

The present invention relates to an electron microscope and more particularly to means for improving the focussing of the image of an object to be enlarged on the fluorescent screen, as well as means for stereoscopic observation of an object.

In observing an image of the object through an electron microscope, it is difficult to tell, whether or not the high-definition plane reproduced on the screen (object plane) coincides with the plane in which the object under examination is located. This is due to the depth of definition of the image, as will be more fully explained in the course of the following specification.

It is the object of the present invention to eliminate the difficulties hitherto experienced in the operation of an electron microscope and to provide means for aiding the operator in ascertaining maximum accuracy in focussing of the image on the screen.

Other objects and advantages of the invention will become apparent from the following description.

Generally speaking, the invention relates to an electron microscope of the type in which the radiation passes through the object and in which the electron-ray tube comprising the electron-optical magnifying system is provided with a device for varying, by displacement of the beam of rays, the direction in which the rays strike the object plane. According to the invention, the rays fall upon the same portion of the object plane in rapidly varying direction, and thereby vary the position of the image of said portion on the screen in case focussing is imperfect, whereas the rays passing through the object without being refracted reproduce the image of the same portion in a different position on the screen. The unsharpness of a faultily focussed object, otherwise imperceptible to the observer, is thus made noticeable by the displacement of the image.

While the device may be operated mechanically by moving the source of rays itself and the condenser, the preferred construction comprises, as the device for moving the beam of rays, a deflection system acting electrostatically or electromagnetically upon the rays and energized by alternating voltage or pulsatory voltage.

In order that the invention may be fully understood, it will hereinafter be described with reference to the accompanying drawings, in which Figs. 1 and 2 illustrate diagrammatically the path of rays in a simple projection system of known construction, without or with the use of a condenser, respectively;

Fig. 3 is a similar diagram, illustrating the path of rays as modified by the means according to the invention;

Fig. 4. shows diagrammatically, by way of example, one form of an electron microscope according to the invention, in a sectional view through the optical axis of the electron ray tube;

For better understanding, the difficulties hitherto experienced in focussing the image observed through an electron microscope on the screen will now be described with reference to Figs. 1 and 2.

Figure 1:
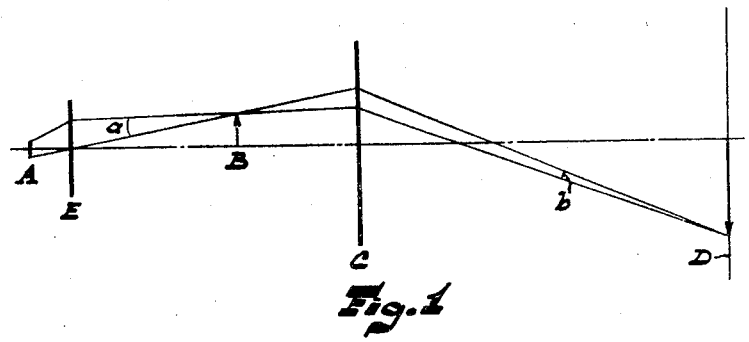
Figure 2:
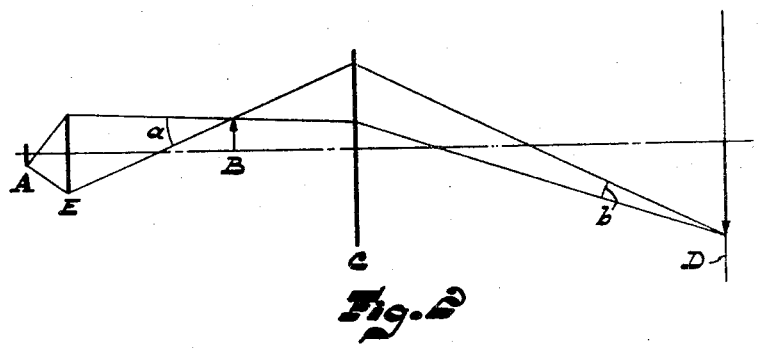

Fig. 1 shows the path of the rays which, emanating from a source of rays A, produce an image of a flat object B by means of a lens C. This image is located in a plane D. The source of rays A may be a light source, or the cathode of an electron-ray tube or the image formed of this cathode by a pre-concentration system. In order to enlarge the apical angle $a$ of the cone of rays which strikes a point of the object, i. e. to increase the light intensity of the image produced, a condenser E is provided between the source of rays and the object.

In the drawing, the lenses are shown as flat surfaces at right angles to the plane of the drawing and the rays as broken straight lines. The fact that this is not actually in conformity with an electron optical system does not change the results shown by the drawing.

The spacing between the object B and the plane C is larger than the focal distance of the lens, but smaller than twice this distance, so that the lens produces a real, magnified image of the surface of the object B. For the sake of clearness this magnification is, in the drawing, cut down to approximately 3. In electron microscopes it may be 20,000 or more.

For one point of the image the cone of rays forming this image point is shown in the drawing. The apical angle $b$ of this cone of rays is smaller than the apical angle $a$ and it will be readily seen that it becomes smaller as the magnification increases. It may be assumed that $b$ approximately equals $$\frac{1}{V}a$$

V denoting the magnification. In the case of considerable magnification, it cannot be discerned whether the point of intersection of the rays emanating from a point of the object exactly lies within the plane D or outside it, since on account of the small angle $b$ the sectional area of the cones of rays, even at a considerable distance from this point of intersection, is so small that no difference in size is perceptible with the naked eye.

In the case of electron microscopes the image is, as a rule, adjusted by varying the focal distance of the lens or, in case there are several lenses, the focal distance of the first lens (the objective). It is thus endeavored to focus the image as sharply as possible with the eye, but for the aforesaid reason it is never certain whether the sharply-defined surface reproduced is the desired object surface. This is not objectionable for direct observation of the image, since better results cannot be observed even with actually sharp focussing, but it is unsatisfactory when the image is to be photographed and subsequently examined under a magnifying glass or when it is to be magnified.

A well-known means for sharper focussing of the image formed by a projection apparatus consists in concentrating the radiation on the object by means of the condenser lens. The effect brough about by this means is illustrated in Fig. 2. Here the image of the source of rays A formed by the condenser E lies in the plane of the object B. When this occurs, the screen D exhibits maximum brightness. When the image of the object B is now focussed as sharply as possible by means of the lens C, so that an image of the source of light is also formed on the plane D, the apical angle at which the extreme rays forming an image point intersect one another will become a maximum. The cone of rays $a$ embraces the entire condenser and the cone of rays $b$ will increase proportionately, so that focussing may be effected with greater accuracy.

After the image has been focussed as sharply as possible, it is necessary to defocus the condenser to take real advantage of the more accurate focussing, since the bad definition resulting from the inaccuracy of the eye has remained unchanged. The image becomes more defined only when the apical angle $b$ is reduced, owing to which the sharpness of the image points originating from planes other than the object plane also increases.

When operating with an electron microscope, a great difficulty is experienced as a consequence of the defocussing operation, viz. a decrease in brightness of the image. It is true that the brightness may be controlled with the aid of the current strength of the beam, but the current strength at which, with the condenser defocussed, the brightness is still sufficient, may be inadmissible while the condenser is focussed on the object, on account of the risk of damage to the object or to the image screen caused by the high concentration of the rays. Thus, prior to focussing the condenser on the object, the current strength would have to be reduced and it would have to be raised again after the depth of definition has been restored. It is, however, not advisable to vary the strength of the beam subsequent to focussing, since the voltage of the supply sources usually employed for the acceleration of electrons is, in many cases, comparatively highly dependent on the load and, since the lenses are not achromatic, variation of the voltage spoils the focussing of the image. Moreover, the charged condition of the object varies, which may cause additional lens effects.

The invention allows of accurate focussing of the image without this disadvantage being involved.

The principle on which the invention is based, will now be explained with reference to Fig. 3. In the projection device shown in this figure, the beam of rays is deflected, by any desired means of deflection, from the axis in the plane F, and deflected in opposite sense in the plane G, in such a manner that the rays which are passing through a point of the object B, when undeflected, pass through the same point by the double deflection. (The latter is not required for the use of the invention, as will be explained hereinafter.) As long as the deflection system is not operative, the image of the point under consideration is formed by the cone of rays $b$. After the beam has been deflected, the same image point is formed by the cone of rays $c$.

Figure 3:
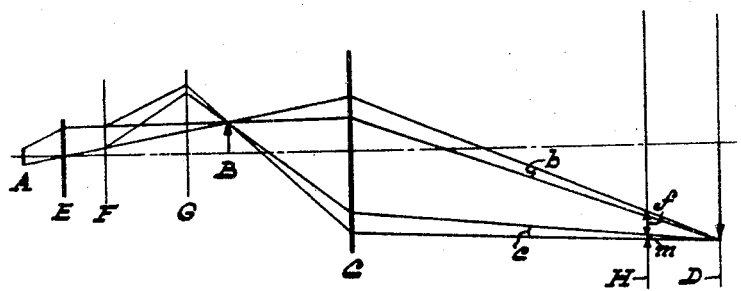

Assuming that the fluorescent screen, instead of being located in the plane D, lies in the plane H, parallel to the image plane D, the displacement from $b$ to $c$ would, as is evident from Fig. 3, involve a displacement of the image over a distance $f$, which is a few times larger than the width $m$ of the unsharpness. Although the unsharpness of the image point in the plane H, would be just imperceptible with the naked eye, ($m=0.1$ mm., for example), this displacement could be observed. Thus, the displacement of the beam of rays as described produces a displacement of the image on the screen, if the latter does not coincide with the image plane of the object B, but is, as in the figure, at an appreciable distance therefrom. If, according to the invention, the cone of rays oscillates between $b$ and $c$ with a certain speed, a widening of the image points and a greatly reduced contrast of brightness, hence blurring is observed. This speed is already sufficiently high if the period of the movement is two thirds of a second. A higher frequency is liable to improve the effect; this depends on the phosphorescence of the screen.

As a result of the invention, the image may be focussed with greater accuracy by varying the focal distance of the lens C, until rapid movement of the beam of rays no longer provokes blurring of the image of the object under examination. The disadvantage involved by variation of the current strength is thus not experienced, since the current strength is not being changed at all.

An electron microscope is known in which the electron-ray tube comprises a deflection system which directs the electron-ray obliquely on to the object. The object of the deflection in this known microscope differs from that aimed at by the invention. There the rays passing unrefracted through the object are collected without reaching the lens, the latter only utilizing rays refracted in the object. Furthermore, a stationary beam is caused to fall obliquely on the object in order to ensure a luminous image which is more or less the negative of that which the electrons passing straight through the object would produce.

The microscope according to the invention differs from that above referred to in that the beam of rays oscillates and that the angle enclosed between the beam of rays and the perpendicular on the object plane remains so small that the rays traversing the object without refraction pass through the objective and thus remain directed towards the screen, illuminating the latter with sufficient brightness to render the image formed by these rays clearly perceptible. This condition is at any rate fulfilled, if the axis of the unrefracted electron-ray passing through the object still strikes the screen. The required minimum difference in direction is dependent on the magnification. For a magnification of 20,000 an angle of 0.01 rads. is just sufficient to visualize incorrect focussing on an object plane located 0.001 mm. in front of the plane B (shifted towards the source of rays). In this case a point of the plane of B is reproduced (ill-defined) by little beams of rays, the axes of which intersect the (incorrect) object plane at points which are spaced 0.01×0.001 mm., thus 0.00001 mm. These points are reproduced on the screen with a spacing which is 20,000 times larger and thus of 0.2 mm. Such a displacement is already perceptible with the naked eye.

It may be of advantage to utilize a device which not only causes the beam of rays to oscillate one plane, but which imparts to it a spatial oscillation. In the case of ill-defined reproduction, a point is then reproduced in the form of a small ellipse, circle of other flat figure, so that we are no longer dependent on the accidental direction of the lines of which the image is composed. For this purpose provision may, for example, be made of two sets of deflection plates or coils which are successively traversed by the rays and which are at right angles relative to one another, but use may, as an alternative, be made of a system which is adapted to produce rotary fields which cause the beam to describe a conical surface.

After the image has been focussed with an oscillating beam of rays to the maximum definition of the plane to be examined, the voltage of the deflection system may be switched off or the moving mechanism may be made inoperative, whereafter an image with increased depth of definition is obtained.

It has been suggested before (see French Patent No. 891,549) to provide an electron microscope with a deflection system comprising two sets of plates at right angles to one another. This system is designed in such manner that the beam is always displaced parallel to itself, the system serving to direct the rays through a definite point of the object plane.

According to this patent, use may also be made of a movable diaphragm for moving the beam of rays over the object. This diaphragm causes the direction of the rays to be modified to a certain extent, but it does not change the direction of the rays which strike the same portion of the object plane. In this construction, a modified direction of the rays is associated with another point of the object plane. The said patent furthermore discloses a movable condenser, but this condenser can only be moved together with the electron gun, so that the axis of the condenser always coincides with that of the electron beam and variation in the direction of the cones of rays on the screen is prevented. The movability serves in this case to permit scanning of the object.

The difference between the microscope according to the invention and the devices referred to is obvious when considering that supplying the deflection systems with alternating voltage would render the deflection systems of the known microscopes inoperable, since the latter are only operating with stationary beams.

Figure 4:
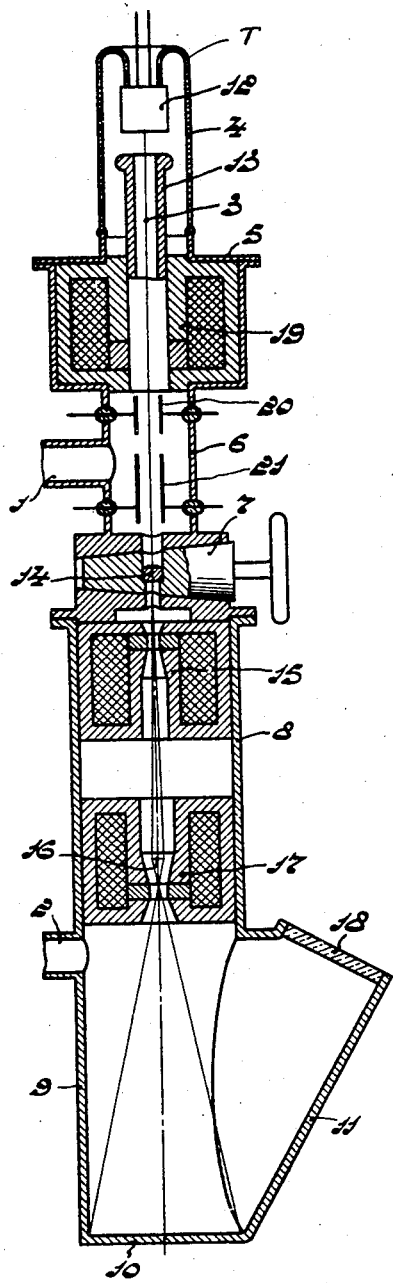

An embodiment of the electron microscope according to the invention will now be described with reference to Fig. 4.

The microscope comprises a tube which is generally designated by T and which is a closed vessel consisting of a number of portions described hereinbelow; in operation, the tube is connected through a pair of suction pipes 1 and 2 to an airpump and thus kept exhausted. The vessel is substantially a cylinder, the axis of which is designated by 3.

As viewed from the top, tube T comprises first a glass bulb 4, the bottom end of which is sealed to a metal box 5; the box carries a metal connecting piece 6, the bottom of which is provided with a plug or stopper cock 7. Next, there is a wider metallic cylinder 8 and finally an end portion 9 closed by a bottom 10 and provided at one side with an oblique branch 11.

Arranged within the glass bulb 4 are a source of electrons 12 and a cylinder 13 secured to the metal box 5. A high direct voltage of, for example, 100 kilovolts is set up between a source (not shown), the cylinder 13 being positive, so that it is active as an anode and a ray of electrons emanating from the electron gun formed by the parts 12 and 13 passes along the axis 3 directly into the vessel.

The plug cock 7 is provided with a container 14 which serves for receiving the object. This may be, for example, a small crystal or a little piece of microscopic tissue. The electron ray penetrates through this object and is then subject to the influence of an electron-optical lens 15, the objective. This lens produces a magnified image 16 of the object closely in front of the focus of a second electron-optical lens 17, which in turn reproduces a magnified image of 16 on the bottom 10. The latter is coated with a thin layer of a substance which is fluorescent on being struck by electron rays, such, for example, as zinc sulphide. Thus, the image is made visible on the bottom 10. The branch 11 serves for the observation of the image. It is closed hermetically by a glass plate 18 which, if desired, may be in the form of a magnifying glass. The metal box 5 between the electron gun and the object container further comprises an electron-optical lens 19. This lens is the condenser and serves to cause a larger part of the rays emitted by the electron gun to fall on the object, thus ensuring greater brightness of the image.

In this example the lenses 19, 15 and 17 are in the form of magnetic lenses. Their construction and operation are well known, so that no further explanation will be required. As a rule, magnetic lenses are preferred, but the invention also applies to microscopes comprising electrostatic lenses.

For sharp focusing of the image on the bottom 10, the current passing through the coils of the magnetic lenses may be varied or, in the case of electrostatic lenses, a variation of the voltage of these lenses, of the position of the object, or the action of a supplementary magnetic lens, may be effected. This is continued until the image on the screen is observed with maximum definition.

As has been set out in the preamble, it is difficult to ascertain whether the lenses reproduce the section of the object under examination with sufficient accuracy. For this reason, the connecting piece 6 comprises two pairs of deflection plates 20 and 21, which are provided with supply conductors passed through the wall of the connecting piece 6 in an insulated manner, so that they are adapted to convey a suitable voltage. These deflection plates operate in the same manner as those in the electron-ray tube of an oscilloscope, except that both of them produce a deflection in the same plane, whereas in an oscilloscope, deflection is usually produced in two planes at right angles to one another. The plates are assumed to have their planes at right angles to the plane of the drawing so that, if a potential difference is set up between the plates, the beam is deflected, but remains in the plane of the drawing.

If it is desired to impart a spatial oscillation to the beam of rays, provision may be made for this purpose by arranging a second set of plates having their planes parallel to the plane of the drawing.

If the plates of the first pair 21 are made longer (in an axial direction) than those of the second pair 20, or if a higher voltage difference is set up at times, the second deflection, i. e. the angle through which the electron ray is deflected by the field between the plates, is larger than the first. This means that the beam, after having passed through the two deflection fields, moves again towards the axis to intersect it at a certain point.

In the microscope according to the invention the deflection voltages are so chosen that the point of intersection of the axis of the beam deflected by the plates and the axis of the beam which is produced when the plates are not energized or energized in opposite sense, is located either close to the plane containing the object to be reproduced or in this plane. It will be preferred to make it exactly coincide with this plane, when the beam is narrow, in order to keep a maximum portion of the object within the beam. If a somewhat wider electron beam is available, this is not required. In this case, it will not even be necessary for the beam to be deflected twice; a single plate or coil system will be sufficient for the deflection.

Figure 5:
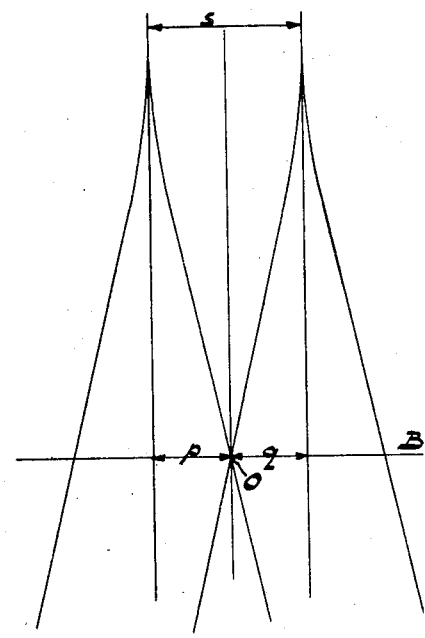
Fig. 5 is a diagrammatic illustration of an electron beam as deflected.

The foregoing will now be explained with reference to Fig. 5. This figure illustrates part of the electron beam having a width s and being supposed to consist of parallel cathode rays. Actually, the beam does not consist of parallel rays, but consists of cones of rays, the axes of which are not exactly parallel either, but the divergence is mostly slight and does not alter the consideration to be made with reference to Fig. 5.

It is assumed that the electron beam is deflected to the left to such extent that the extreme ray on the right-hand side just passes through the point O in which the axis of the non-deflected beam intersects the plane of the object B. It is seen that the part p of the object reproduced by the straight beam is reproduced even in this case. If the beam is bent equally far to the right, it is not the part p, but the part q, that is reproduced. Thus, if the beam is caused to oscillate between the positions as shown by means of a deflection system fed by alternating voltage, a part of the object plane located in the proximity of the axis is nevertheless reproduced. Owing to the high magnification, a small portion of the object is sufficient. It is seen that in this case the direction of the beam striking one definite point varies.

Instead of a movement by means of deflected fields, movement of the beam of rays may be ensured by mechanically-operating means. Thus, the electron gun, i. e. the combination of cathode, anode, and, as the case may be, control grid, may be arranged to be movable, for example, by means of a resilient system, and set into oscillation. However, this construction cannot be readily carried out, since, on account of the restricted width of the beam, a movable arrangement would be required which has the center of the movement invariably located approximately in the object plane. For the same purpose the condenser 19 could be arranged to be movable in such manner that it could perform a vibration at right angles to the axis of the tube. However, it will be evident that troublesome oscillations would be caused by such vibrating systems and that these solutions are, consequently, less suitable for practical use than those in which the beam of rays is pushed to the side by the electrical or magnetic field of a stationary deflection system.

For the observation of very thin objects it may be desirable to have another plane reproduced on the screen instead of the paraxial plane of the object. This is, for example, required if greater contrasts are desired. On adjusting with the naked eye there is, likewise, a tendency to adjust to a maximum of contrast and adjustment is then made to a plane slightly further from the lens, for example 0.005 mm. In order to ensure a maximum of resolving power, the adjustment must also be effected to a plane slightly farther from the lens than the plane of the object. The distances between the planes and the plane of the object are dependent on the construction of the lenses, but they are constant in any one microscope.

In one particular form, the microscope according to the invention comprises a device to allow of such a modified adjustment. In this case, a control member included in the current circuit or circuits by which the objective lens is energized, is coupled to the member by which the device for varying the direction of the rays is put into or out of action, this control member being adjusted in such manner that by switching out the said device the objective lens is slightly defocussed and the object plane of this lens is shifted towards the desired plane.

Figure 6:
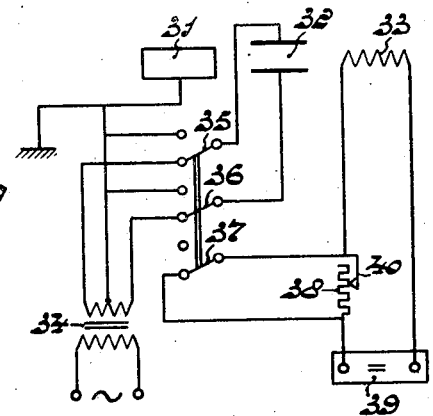
Fig. 6 is a simplified circuit diagram of the device according to the invention.

A simplified circuit diagram of such a device is shown in Fig. 6. In this figure, 31 designates the anode of the electron-ray tube, 32 a pair of deflection plates and 33 the coil of the objective lens. A transformer 34 supplies an alternating voltage to the plates 32. The center of the secondary winding of this transformer is directly connected to the anode 31, which is, for example, at earth potential. Thus, the plates have set up between them an electrical alternating field which causes oscillation of the electron ray. The connections of the transformer 34 to the plates 32 extend via switches 35 and 36 which are mechanically coupled and thus moved as one assembly. The switches 35 and 36 are coupled to a third switch 37, which is consequently moved simultaneously therewith. It is connected to the ends of a resistance 38 which forms part of the current circuit of the coil 33 which is fed by a current of variable strength supplied by a direct-current source 39. This current source comprises the member (not shown) for controlling the optical strength of the lens 33.

In the position shown the resistance 38 is short-circuited. When the switches 35, 36 and 37 are changed-over, the connections of the plates 32 to the transformer 34 are interrupted and the plates themselves are both connected directly to the anode, so that the electron beam no longer oscillates but enters straight into the microscope. At the same time the short-circuit of the resistance 38 is removed, so that the energizing current of the coil 33 is slightly attenuated and the focal distance of the objective is slightly increased. By means of an adjustable contact 40, the extent of this increase may be varied, so that the most suitable object plane may be chosen.

The beam may, as an alternative, be caused to describe a conical plane having an apical angle such that, owing to the spherical aberration of the lens, the adjustment is effected exactly to the correct plane, since the point of intersection of the rays refracted by a non-spherically corrected lens lies closer to the lens as the angle of deviation becomes larger.

According to the invention, the presence of the device for varying the direction of the beam of rays may at the same time be utilized for another purpose. It is immaterial for the image of the object plane whether the beam is stationary or oscillating, but the angle at which the rays strike the object plane does affect the position of the lines and points composing this (sharp) image with respect to those forming the (not very sharp) reproduction of adjacent planes. Hence, the microscope according to the invention also permits of observing the object stereoscopically. For this purpose, the microscope is completed by a device by which the images produced in two positions by the rays are rendered perceptible for each eye separately. Thus, the image may be observed in three manners, i. e. topographically, stereographically and (after having switched out the deflection system) in the usual manner with depth of definition. Devices for stereoscopic observation as referred to are known per se, for example, from X-ray technique and need therefore no further description. They are, for example, constituted by a mask having two observation holes which are alternatively covered by a rotating wing. This wing is required to move in synchronism with the alternating voltage energizing the deflection system, so that one eye observes the image in one phase and the other in the opposite phase. It is in this case desirable that the alternating voltage should exhibit a constant value, during each half cycle, at least during a large part thereof, in order that the image, instead of shifting incessantly, may exhibit two periodical positions of rest which alternate rapidly. Devices producing such alternating voltages are known for many other purposes. The ideal form of the voltage curve may be approximated by using sinusoidal voltage varying with time and having a strong third harmonic.

What I claim is:

1. In an electron microscope of the type having a tube, a carrier in said tube for an object to be magnified, an electron optical magnifying system, a fluorescent screen, and a source for emitting electron rays which pass through said object, in combination, an arrangement comprising means capable of intermittently deflecting the beam of electron rays so as to vary in succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable.

2. In an electron microscope of the type having a tube, a carrier in said tube for an object to be magnified, an electron optical magnifying system, a fluorescent screen, and a source for emitting electron rays which pass through said object, in combination, an arrangement comprising means capable of intermittently deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable, and means in said arrangement for energizing said deflecting means by alternating electrical energy.

3. In an electron microscope of the type having a tube, a carrier in said tube for an object to be magnified, an electron optical magnifying system, a fluorescent screen, and a source for emitting electron rays which pass through said object, in combination, an arrangement comprising means capable of intermittently deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable, and means in said arrangement for energizing said deflecting means by pulsating electrical energy.

4. In an electron microscope of the type having a tube, a carrier in said tube for an object to be magnified, an electron optical magnifying system, a fluorescent screen, and a source for emitting electron rays which pass through said object, in combination, an arrangement comprising means capable of intermittently deflecting the beam of electron rays so as to vary by spatial oscillation the directions in which the rays strike a given point on the subject and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable.

5. In an electron microscope of the type having a tube, a carrier in said tube for an object to be magnified, an electron optical magnifying system, a fluorescent screen, and a source for emitting electron rays which pass through said object, in combination, an arrangement comprising at least one pair of electrically energizable members capable of intermittently deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable.

6. In an electron microscope of the type having a tube, a carrier in said tube for an object to be magnified, an electron optical magnifying system, a fluorescent screen, and a source for emitting electron rays which pass through said object, in combination, an arrangement comprising at least one pair of parallel plates arranged in the circuit of the electron optical system, capable of intermittently deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable.

7. In an electron microscope of the type having a tube, a carrier in said tube for an object to be magnified, an electron optical magnifying system, a fluorescent screen, and a source for emitting electron rays which pass through said object, in combination, an arrangement comprising two pairs of electrically energizable members capable of intermittently deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable.

8. In an electron microscope of the type having a tube, a carrier in said tube for an object to be magnified, an electron optical magnifying system, a fluorescent screen, and a source for emitting electron rays which pass through said object, in combination, an arrangement comprising two pairs of parallel plates arranged in the circuit of the electron optical system, each pair having its plates arranged in the same planes as the other pair, said plates being capable of intermittently deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable.

9. In an electron microscope of the type having a tube, a carrier in said tube for an object to be magnified, an electron optical magnifying system, a fluorescent screen, and a source for emitting electron rays which pass through said object, in combination, an arrangement comprising two pairs of parallel plates arranged in the circuit of the electron optical system, one pair of plates being arranged at right angles with respect to the other pair of plates, said plates being capable of intermittently deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable.

10. In an electron microscope of the type having a tube, a carrier in said tube for an object to be magnified, an electron optical magnifying system, a fluorescent screen, and a source for emitting electron rays which pass through said object, in combination, an arrangement comprising two pairs of electrically energizable members arranged in the circuit of the electron optical system and means for intermittent actuation of said members, said members being capable of deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, whereby the unsharpness of the faultily focussed object, otherwise imperceptible to the observer, is made noticeable.

11. In an electron microscope of the type described an arrangement according to claim 10, wherein an adjustable control member is included in that part of the circuit which serves for energizing the objective lens of said electron optical system, said control member being coupled to the means for the actuation of said deflecting members and being capable of slightly varying the focal distance of the objective lens when said deflecting members are cut out of the circuit.

12. In an electron microscope of the type having a tube, a carrier in said tube for an object to be magnified, an electron optical magnifying system, a fluorescent screen, and a source for emitting electron rays which pass through said object, in combination, an arrangement comprising means capable of intermittently deflecting the beam of electron rays so as to vary in rapid succession the directions in which the rays strike a given point on the object and, thereby, vary the position of the image of said point on the screen in case focussing is imperfect, said arrangement allowing undeflected rays to pass through the object onto the screen and to reproduce the image of said point thereon in a different position than the deflected rays, and means in said arrangement for separately observing by each eye a different one of two positions in which said point is reproduced on the screen.

13. In an electron microscope as claimed in claim 12 an arrangement wherein the deflecting means is energized by alternating electrical energy which comprises a strong third harmonic.

JAN BART LE POOLE.

No references cited.